United States Patent [19]
Müller

[15] 3,665,833
[45] May 30, 1972

[54] DELAYED SHUTTER RELEASE MECHANISM FOR PHOTOGRAPHIC APPARATUS

[72] Inventor: Manfred Müller, Donaueschingen, Germany

[73] Assignee: Agfa-Gevaert Aktiengesellschaft, Leverkusen, Germany

[22] Filed: Apr. 23, 1971

[21] Appl. No.: 136,845

[30] Foreign Application Priority Data

Apr. 24, 1970  Germany......................P 20 19 908.0

[52] U.S. Cl.................................................95/53.3, 352/175
[51] Int. Cl. ...........................................................G03b 9/64
[58] Field of Search...................95/53.3; 352/175, 176, 177, 352/178, 179

[56] References Cited

UNITED STATES PATENTS 2,194,158  3/1940  Adams.....................................352/175
3,567,316  3/1971  Wilharm..............................352/175 X

FOREIGN PATENTS OR APPLICATIONS 822,873  11/1959  Great Britain.........................352/175

Primary Examiner—Samuel S. Matthews
Assistant Examiner—Monroe H. Hayes
Attorney—Michael S. Striker

[57] ABSTRACT

A delayed shutter release mechanism for use with cameras wherein the shutter is actuated in response to completion of an electric circuit has two terminals which are connectable to separate contacts of a switch in the body of the camera. The two terminals are electrically connected with each other in response to pivoting of one of two levers into contact with the other lever. The levers have followers which track a rotary cam having several equidistant flanks. The followers are located at one side of a flank when the release mechanism is ready for use, namely, when a spring motor stores sufficient energy to rotate the cam in response to actuation of a trigger. The levers remain out of contact with each other while a flank of the cam moves toward and past one of the followers. The one follower is then caused to change its angular position and to place the respective lever into contact with the other lever. The levers remain in contact during the interval which elapses while the flank of the cam moves between the two followers. The distance between the two followers is adjustable to thereby change the length of the interval during which the two levers contact each other.

22 Claims, 2 Drawing Figures

Patented May 30, 1972

3,665,833

INVENTOR
MANFRED MÜLLER
BY Michael S. Striker
Attorney

3,665,833

DELAYED SHUTTER RELEASE MECHANISM FOR PHOTOGRAPHIC APPARATUS

BACKGROUND OF THE INVENTION

The present invention relates to improvements in delayed shutter release mechanisms (also called self-timers) for photographic apparatus. More particularly, the invention relates to delayed shutter release mechanisms for use with photographic apparatus of the type wherein the actuation of shutter is initiated by closing of a switch to complete an electric circuit which may include an electric motor for the rotary shutter of a motion picture camera or an electromagnet which is energizable to effect the opening of one or more shutter blades in a still camera. Such shutters are well known in the art.

As a rule, a delayed shutter release mechanism comprises means for actuating the shutter of the photographic apparatus with a predetermined delay and for terminating the operation of the shutter after elapse of a predetermined interval which begins at the moment of completion of the delay. For example, the delay can be in the range of a few seconds and the length of the interval during which the shutter is operative can be in the range of one or more seconds.

SUMMARY OF THE INVENTION

An object of the invention is to provide a simple, compact, rugged, reliable and relatively inexpensive delayed shutter release mechanism which can be used with still cameras or with motion picture cameras of the type wherein the shutter is actuated in response to completion of an electric circuit.

Another object of the invention is to provide a delayed shutter release mechanism or self-timer mechanism wherein the length of the interval which elapses between the actuation of release mechanism and the actuation of shutter and/or the length of the interval during which the shutter remains operative can be adjusted in a simple and time-saving manner.

A further object of the invention is to provide a delayed shutter release mechanism which can be used with existing still cameras and motion picture cameras of the type wherein the shutter is actuated in response to closing of a switch and which can be rapidly connected with or detached from a still camera or motion picture camera.

An additional object of the invention is to provide the release mechanism with novel means for winding the spring motor which serves to drive the moving parts of the release mechanism and with novel means for completing an electric circuit in the photographic apparatus with a fixed or variable delay following actuation of the release mechanism.

The improved delayed shutter release mechanism is to be used in photographic apparatus wherein the shutter is actuated in response to completion of an electric circuit. The release mechanism comprises rotary cam means having at least one substantially radially extending tooth flank, spring motor means which can store energy to thereupon rotate the cam means in a predetermined direction, winding means for the motor means, blocking means for normally holding the cam means against rotation, trigger means operable by hand or by remote control to thereby disengage the blocking means and to thus permit the motor means to rotate the cam means, and first and second current-conducting circuit-completing regulating members which have followers tracking the cam means under the action of resilient means and being disposed at one side of a flank when the motor means stores energy and the blocking means is operative to hold the cam means against rotation. The regulating members are then out of contact with each other and the circuit which must be completed in order to actuate the shutter is open. The cam means permits or causes one of the regulating members to contact the other member after the cam means is rotated through a first predetermined angle to move the aforementioned flange beyond one of the followers. The regulating members thereupon remain in contact with each other while the cam means rotates through a second angle which is preferably adjustable to thus select the length of the interval during which the circuit in the camera to which the release mechanism is connected remains completed.

The release mechanism further comprises two terminals which are normally insulated from each other and are electrically connected with each other in response to movement of the one regulating member into contact with the other regulating member, i.e., while the cam means rotates through the second angle subsequent to movement of the flange beyond one of the followers and until the flange moves beyond the other follower.

The novel features which are considered as characteristic of the invention are set forth in particular in the appended claims. The improved release mechanism itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
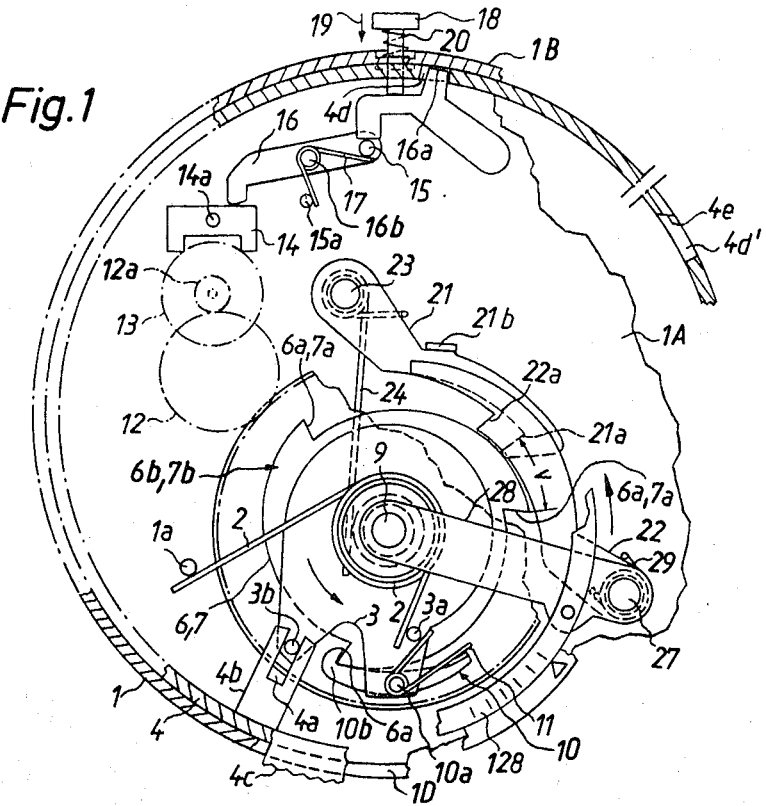
FIG. 1 is a fragmentary front elevational view of a release mechanism which embodies the invention, with a portion of the housing and certain other parts partly broken away.
Figure 2:
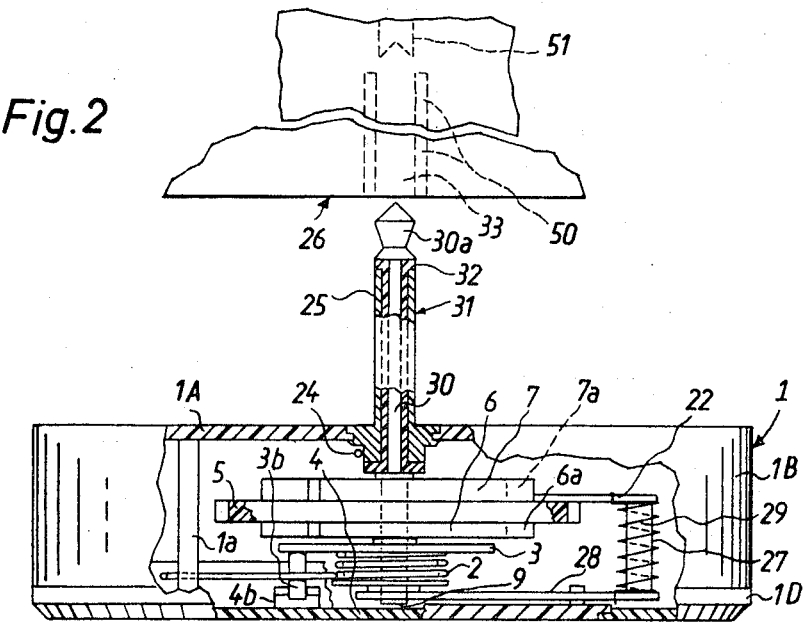
FIG. 2 is a plan view of the release mechanism with portions of the housing and certain other parts broken away, and further showing a portion of a photographic apparatus whose shutter can be actuated by the release mechanism.

The drawing illustrates a release mechanism which is connectable with a photographic apparatus 26 of the type wherein the shutter mechanism (not shown) is actuated in response to completion of an electric circuit including a first contact 50 which defines a socket 33 and a second contact 51 which is insulated from the first contact 50. The shutter mechanism in the apparatus 26 is actuated in response to completion of the circuit from the contact 50 to the contact 51 by way of current-conducting elements in the housing 1 of the release mechanism.

The housing 1 is of circular shape and accommodates a spring motor including a torsion spring 2 one arm of which bears against a stationary post 1a fixed to the rear wall 1A of the housing 1. The other arm of the spring 2 bears against a post 3a provided on a driving disk 3 which also forms part of the motor and can be rotated in a clockwise direction, as viewed in FIG. 1, by a winding means to thereby cause the spring 2 to store additional energy. The winding means comprises a rotary element here shown as a ring 4 which is inwardly adjacent to the cylindrical wall 1B of the housing 1 and has a radially inwardly extending projection 4b provided with a slot 4a for a pin 3b of the driving disk 3. The ring 4 has an outwardly extending knurled or serrated projection or lug 4c which extends through an arcuate slot 1D of the cylindrical wall 1B so that it can be readily engaged by a finger in order to rotate the driving disk 3 in a clockwise direction. FIG. 1 illustrates the torsion spring 2 in fully stressed condition in which the spring stores a maximum amount of energy and tends to rotate the driving disk 3 in a counterclockwise direction. The disk 3 can rotate a gear 5 through the intermediary of a one-way clutch only when the spring 2 is free to dissipate energy, i.e., while the disk 3 rotates in a counterclockwise direction. The gear 5 is flanked by and is preferably integral with two identically configurated disk-shaped cams 6 and 7 which are disposed in two parallel planes.

The cams 6, 7 are respectively provided with three equidistant substantially radially extending tooth flanks or edge faces 6a, 7a. Each flank 6a registers with a flank 7a. The inner or root portion of each flank 6a, 7a is connected with the outer or top land portion of the preceding flank 6a, 7a (as considered in the direction of rotation of the cams 6, 7) by a convex cam face 6b, 7b. At the present time, I prefer to employ a one-piece synthetic plastic member which includes the gear 5 and the cams 6, 7.

The aforementioned one-way clutch between the driving disk 3 and the gear 5 comprises a pawl 10 which is pivotally mounted on the disk 3, as at 10a, and has a pallet 10b biased in a clockwise direction, as viewed in FIG. 1, by a torsion spring 11. Thus, when the driving disk 3 is caused by the spring 2 to rotate in a counterclockwise direction, the pallet 10b engages the nearest flank 6a of the cam 6 and rotates the parts 5, 6, 7 with the disk 3. During winding of the spring 2, i.e., when the ring 4 rotates the disk 3 in a clockwise direction, as viewed in FIG. 1, the pallet 10b rides along successive convex faces 6b of the cam 6 so that the parts 5, 6 and 7 need not share such movement of the disk 3.

The speed at which the cams 6, 7 can rotate in response to dissipation of energy by the spring 2 is regulated by an escapement mechanism or retarding mechanism which includes the aforementioned gear 5, a gear 12 meshing with the gear 5, a further gear 12a which meshes with the gear 12, an escapement wheel 13 which is driven by the gear 12a, and a two-pronged escapement anchor 14 which cooperates with the wheel 13 and is oscillatable on a pivot pin 14a. The anchor 14 is normally held against oscillatory movement about the axis of the pin 14a by a blocking lever 16 which is fulcrumed at 16b and is biased in a counterclockwise direction, as viewed in FIG. 1, by a torsion spring 17. One arm of the spring 17 bears against a post 15 on the lever 16 and its other arm bears against a post 15a on the wall 1A. The longer arm of the blocking lever 16 has an extension or tooth 16a which automatically enters one of several recesses or holes 4d in the ring 4 when the spring 2 is in the fully cocked position shown in FIG. 1. The release mechanism further comprises a trigger 18 which is depressible by a finger or by remote control in the direction indicated by an arrow 19 to stress a return spring 20 and to pivot the blocking lever 16 in a clockwise direction (against the opposition of the torsion spring 17) to thus free the retarding mechanism in order to permit rotation of the cams 6, 7 in a counterclockwise direction. The shorter arm of the blocking lever 16 then remains disengaged from and permits oscillatory movements of the anchor 14 about the axis of the pivot pin 14a even if the trigger 18 is released to be returned by spring 20 to the starting or idle position of FIG. 1 because, as soon as the driving disk 3 begins to rotate in a counter-clockwise direction, its pin 3b entrains the ring 4 by way of the extension 4b so that the recess 4d moves away from the tooth 16a and the latter bears against the internal surface of the rotating ring 4 to thus prevent the shorter arm of the blocking lever 16 from interfering with oscillatory movements of the anchor 14. It will be noted that the depression of trigger 18 in the direction indicated by arrow 19 results in release of the rotary parts 3, 4, 5, 6, 7, 12, 12a and 13 at two spaced points, namely, the anchor 14 permits rotation of the escapement wheel 13 at a controlled speed, and the tooth 16a permits rotation of the ring 4 at the speed which is determined by the retarding mechanism 5, 12, 12a, 13, 14.

The length of the first interval which must elapse between the depression of trigger 18 to permit rotation of the cams 6, 7 in a counterclockwise direction and the actuation of shutter in the photographic apparatus 26 is determined by two current-conducting circuit-completing regulating members in the form of levers 21, 22. The levers 21, 22 further serve to determine the length of a second interval during which the circuit including the contacts 50, 51 of the apparatus 26 remains completed following the elapse of the first interval. It is assumed that the apparatus 26 is a motion picture camera and that the shutter is operated for a (second) interval of time starting with completion of the circuit which includes the contacts 50, 51 so that the motion picture camera can make a predetermined number of exposures. The lever 21 is pivoted to terminate the first interval, and the lever 22 is pivoted to terminate the second interval.

The lever 21 is pivotable about the axis of a shaft 23 which is mounted on the wall 1A and this lever has a follower here shown as a tooth 21a which is biased against the periphery of the cam 7 by a torsion spring 24. One arm of the spring 24 bears against the outer sleeve or terminal 25 of a stud 31 which is insertable into the socket 33 of the contact 50 in the motion picture camera 26. The spring 24 and the terminal 25 consist of current-conducting material (i.e., they constitute two conductors) so that the lever 21 is electrically connected with the contact 50 when the stud 31 is introduced into the socket 33.

The lever 22 is pivotable about the axis of a shaft 27 which is mounted at the outer end of an adjusting link 28 turnable about the axis of a shaft 9 for the driving disk 3, gear 5 and cams 6, 7. The shaft 27 is movable along an arcuate scale 128 whose center of curvature is located on the axis of the shaft 9. The scale 128 is graduated to indicate the duration of the aforementioned second interval, e.g., in seconds. The link 28 is preferably a leaf spring which bears against the housing 1 with sufficient friction to prevent accidental shifting of the shaft 27. A helical spring 29 is convoluted around the shaft 27 and constitutes a conductor between the lever 22 and the link 28. The shaft 27 consists of insulating material but the shaft 9 conducts current and has a smaller-diameter extension or terminal 30 which passes through the current-conducting tubular terminal 25 of the stud 31 and has a conical tip 30a which engages the contact 51 when the stud 31 is fully inserted into the socket 33 of the contact 50. The terminal 25 is electrically separated from the terminal 30 by a cylindrical sleeve-like insulator 32. The contacts 50, 51 form part of a normally open switch which is mounted in the motion picture camera 26 and must be closed by way of current-conducting elements in the housing 1 in order to actuate the shutter of the camera. The contact 51 can be electrically connected with the contact 50 by the conical tip 30a, terminal 30, shaft 9, link 28, spring 29, lever 22, lever 21, shaft 23, spring 24 and terminal 25. It will be seen that closing of the switch 50, 51 necessitates the placing of lever 21 into contact with the lever 22. The lever 22 has a follower or tooth 22a which engages the periphery of the cam 7. The lever 21 has a projection 21b which can engage the lever 22 in certain angular positions of the cams 6, 7. As shown in FIG. 1, the follower or tooth 21a is spaced from the nearest flank 7a of the cam 7 when the spring 2 is fully cocked, i.e., when the tooth 16a of the blocking lever 16 extends into the adjacent recess 4d of the ring 4 and the shorter arm of the lever 16 holds the anchor 14 against oscillatory movement about the axis of the pivot pin 14a. The followers or teeth 21a, 22a are then located at one side of the nearest flank 7a, namely, that flank 7a which is close to the three o'clock position as the parts appear in FIG. 1.

The distance between the teeth 21a, 22a of the levers 21, 22 can be changed by moving the shaft 27 of the lever 22 along the scale 128, i.e., by turning the adjusting link 28 about the axis of the shaft 9 for the driving disk 3. In the positions shown in FIG. 1, the levers 21, 22 are out of current-conducting contact with each other, i.e., the projection 21b of the lever 21 does not contact the lever 22. It is clear that the link 28 and/or the shaft 27 is accessible from without the housing to allow for adjustment of the distance between the teeth 21a, 22a of the levers 21, 22. These levers are located in two separate planes at one side of the gear 5.

Whenever the winding of the spring motor 2, 3 is completed, the teeth 21a, 22a engage a different face 7b of the cam 7 but the distance between the nearest flank 7a and the teeth 21a, 22a is the same as shown in FIG. 1. This is due to the fact that the cams 6, 7 are arrested after they complete one-third of a revolution and to the fact that the flanks 6a, 7a are equidistant from each other.

The operation:

It is assumed that the spring 2 has been fully cocked by rotating the ring 4 to the position shown in FIG. 1 in which the tooth 16a of the blocking lever 16 extends into the nearest recess 4d. Thus, the ring 4 is held against rotation in a counterclockwise direction under the action of the spring 2, and the shorter arm of the lever 16 blocks the anchor 14. The stud 31 is assumed to be properly received in the socket 33 so that the terminal 25 engages the contact 50 and the tip 30a of the terminal 30 engages the contact 51. The electric circuit in the camera 26 is open because the projection 21b of the lever 21 does not engage the lever 22. If the user of the camera 26 wishes to make a predetermined number of exposures, the trigger 18 is depressed in the direction indicated by the arrow 19 to stress the spring 20 and to expel the tooth 16a of the blocking lever 16 from the adjacent recess 4d. The spring 2 is free to dissipate energy at the rate which is determined by the retarding mechanism 5, 12, 12a, 13, 14. The length of the first interval (between depression of the trigger 18 and completion of the circuit including the switch 50, 51) is fixed and depends on the selected angular distance v between the tooth 21a of the lever 21 and the nearest flank 7a of the cam 7 in the fully cocked position of the spring 2. When this flank 7a covers the distance v (in a counterclockwise direction, as viewed in FIG. 1), the tooth 21a of the lever 21 can move radially inwardly along such flank 7a (under the action of the spring 24) and the projection 21b engages the lever 22 to thus complete the circuit between the contacts 50, 51 by way of the terminal 25, spring 24, shaft 23, lever 21, its projection 21b, lever 22, spring 29, adjusting link 28, shaft 9 and its terminal 30. The shutter in the motion picture camera 26 is started and remains in operation for a selected second interval of time which elapses when the projection 21b of the lever 21 is disengaged from the lever 22. This takes place when the oncoming flank 7a of the cam 7 reaches the tooth 22a of the lever 22 which is then free to pivot in a counterclockwise direction, as viewed in FIG. 1, in order to move away from the projection 21b and to terminate the flow of current between the contacts 50 and 51. It will be seen that the second interval takes up that period of time which elapses while a flank 7a moves between the teeth 21a, 21b. In the illustrated embodiment, the angle which the cam 7 must cover in response to depression of the trigger 18 to cause the lever 21 to contact the lever 22 exceeds the angle which the cam 7 must cover to disengage the lever 22 from the lever 21.

Since the angular distance between the teeth 21a, 22a is adjustable by moving the shaft 27 for the lever 22 along the scale 128, the user can select in advance the length of the second interval, namely, the number of exposures which can be made by the camera 26 during the period of time which elapses from the moment when the projection 21b of the lever 21 engages the lever 22 and the moment when the lever 22 moves away from the projection 21b. The ring 4 continues to rotate in a counterclockwise direction after the lever 22 moves away from the projection 21b. The rotary movement of the ring 4 in a counterclockwise direction is terminated when the driving disk 3 completes one-third of a revolution because the tooth 16a of the blocking lever 16 then penetrates into the oncoming recess (numbered 4d') of the ring 4 under the action of the spring 17 whereby the shorter arm of the lever 16 arrests the anchor 14. The ring 4 is provided with three equidistant recesses or holes 4d. It will be noted that one side of each recess 4d is flanked by a suitably inclined guide surface 4e which allows the ring 4 to rotate in a clockwise direction whereby the tooth 16 penetrates into successive recesses 4d and is automatically expelled from such recesses by sliding along the inclined surfaces 4e.

It will be noted that the spring 2 can rotate the parts 3, 5, 6, 7 in a counterclockwise direction through 120 degrees whenever the trigger 18 is depressed to disengage the tooth 16a of the blocking lever 16 from the ring 4. During winding, the ring 4 is rotated in a clockwise direction by means of the lug 4c whereby the projection 4b rotates the driving disk 3 by means of the pin 3b but the parts 5, 6, 7 remain at a standstill because the pallet 10b of the pawl 10 of the one-way clutch 10, 11 simply rides along successive cam faces 6b of the cam 6. The inertia of the retarding mechanism 5, 12, 12a, 13, 14 suffices to prevent movements of its parts during winding of the spring 2.

It is clear that the improved release mechanism can be used with equal advantage in certain types of still cameras, namely, in still cameras wherein the shutter is actuated (opened) in response to closing of a switch corresponding to the switch 50, 51 of the motion picture camera 26. Thus, when the shutter of a still camera can be actuated in response to closing of a switch and has a bulb (B) setting for time exposures, the improved release mechanism can be used to open the shutter with a fixed delay which is determined by the distance v between the tooth 21a of the lever 21 and the nearest flank 7a of the cam 7 and to thereupon close the shutter with an adjustable delay which depends on the selected angular position of the adjusting link 28, i.e., on the selected length of the interval which must elapse between the moment when the projection 21b of the lever 21 moves into current-conducting engagement with the lever 22 and the moment when the lever 22 moves away from the projection 21b by being able to pivot about the axis of the shaft 27 in a counterclockwise direction, as viewed in FIG. 1. Such pivoting of the lever 22 is caused by the spring 29.

It is further within the purview of the invention to mount the levers 21, 22 in such a way that they do not have to track the same face 7b of the cam 7. All that counts is to provide the lever 21 with a projection (corresponding to the projection 21b) which engages the lever 22 as soon as the tooth 21a is free to slide (under the action of the spring 24) along the oncoming flank 7a while the spring 2 dissipates energy. Also, each of the cams 6, 7 can be provided with two, four or more flanks 6a, 7a. Still further, it is possible to replace the lever 21 with an adjustable lever to permit changes in the length of the first interval (between the depression of trigger 18 and engagement of the projection 21b with the lever 22). Finally, the release mechanism can employ a single cam as long as the levers 21, 22 are normally held out of current-conducting engagement with each other and as long as the pawl 10 does not interfere with movements of the levers 21, 22 or vice versa.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptions should and are intended to be comprehended within the meaning and range of equivalence of the claims.

What is claimed as new and desired to be protected by Letters Patent is set forth in the appended

1. A delayed shutter release mechanism for photographic apparatus wherein the shutter is actuated in response to completion of an electric circuit, comprising rotary cam means having at least one tooth flank; spring motor means arranged to store energy and to rotate said cam means in a predetermined direction; winding means for said motor means; blocking means for normally holding said cam means against rotation; trigger means for disengaging said blocking means to thus permit rotation of said cam means; and first and second current-conducting regulating members respectively having first and second followers tracking said cam means and disposed at one side of said flank when said blocking means holds said cam means to thereby maintain said members out of current-conducting circuit-completing engagement with each other, said members being placed into such circuit-completing engagement in response to rotation of said cam means through a first predetermined angle to thereby move said flank beyond one of said followers and said members being thereupon disengaged from each other in response to rotation of said cam means through a second predetermined angle.

2. A release mechanism as defined in claim 1, wherein said flank moves beyond the other follower when the cam means completes its rotary movement through said second angle, said followers being angularly offset with reference to each other through a distance which corresponds to the magnitude of said second angle.

3. A release mechanism as defined in claim 1, wherein said spring motor comprises a spring and a driving member rotatable by said spring in said predetermined direction to thereby drive said cam means, said driving member being rotatable by said winding means in the opposite direction to thereby stress said spring and further comprising one-way clutch means for rotating said cam means in response to rotation of said driving member in said predetermined direction.

4. A release mechanism as defined in claim 1, wherein each of said regulating members is pivotable about a predetermined axis and further comprising biasing means for pivoting said members in directions to urge said followers against said cam means.

5. A release mechanism as defined in claim 1, further comprising first and second electric terminals, first and second conductor means respectively connecting said first and second regulating members with said first and second terminals, and insulator means interposed between said terminals.

6. A release mechanism as defined in claim 1, further comprising retarding means for determining the speed of rotation of said cam means in response to dissipation of energy by said motor means, said blocking means being arranged to hold said cam means against rotation by way of said retarding means.

7. A release mechanism as defined in claim 6, wherein said winding means comprises a rotary element having at least one recess and said retarding means comprises an escapement mechanism having an anchor which pivots in response to rotation of said cam means, said blocking means comprising a lever which is pivotable by said trigger means from a predetermined position in which a portion of said lever extends into said recess and the lever prevents pivoting of said anchor.

8. A release mechanism as defined in claim 1, wherein said rotary element of said winding means is provided with at least one additional recess into which said portion of said lever extends to thus arrest said rotary element after said cam means completes its rotary movement through said second angle.

9. A release mechanism as defined in claim 8, wherein said cam means comprises a plurality of equidistant tooth flanks and said rotary element is provided with an equal number of equidistant recesses.

10. A release mechanism as defined in claim 1, wherein said cam means comprises a plurality of equidistant tooth flanks and said one follower is located at a predetermined distance from successive flanks upon completion of successive rotary movements of said cam means.

11. A release mechanism as defined in claim 1, wherein said cam means is arranged to disengage said regulating members from each other in response to movement of said flank beyond the other of said followers, and further comprising adjusting means for changing the position of said other follower with reference to said one follower to thereby select the magnitude of said second angle.

12. A release mechanism as defined in claim 11, wherein each of said regulating members comprises a lever and a shaft pivotably mounting the respective lever, one of said shafts being movable with reference to the other shaft to thereby change the position of said other follower with reference to said one follower.

13. A release mechanism as defined in claim 12, wherein said adjusting means comprises a link supporting said one shaft and being turnable about the axis of said cam means.

14. A release mechanism as defined in claim 1, wherein said regulating members are disposed in two separate planes and one of said members comprises a projection which contacts the other member is response to movement of said flank beyond said one follower.

15. A release mechanism as defined in claim 1, wherein said motor comprises a torsion spring and a driving member coaxial with said cam means, said winding means comprising a rotary element coupled with said driving member and rotatable by hand counter to said predetermined direction to thereby wind said spring by way of said driving member, and further comprising one-way clutch means which rotates said cam means in response to rotation of said driving member under the action of said spring but permits rotation of said driving member counter to said predetermined direction.

16. A release mechanism as defined in claim 15, further comprising retarding means for determining the speed of rotation of said cam means, said retarding means comprising a gear coaxial with and connected for rotation to said cam means.

17. A release mechanism as defined in claim 15, wherein said clutch means comprises a pawl pivotably mounted on said driving member and having a pallet, and spring means for biasing said pallet against said cam means so that the pallet engages said flank and rotates said cam means in response to rotation of said driving member in said predetermined direction.

18. A release mechanism as defined in claim 17, wherein said cam means comprises two congruent disk-shaped cams each having a plurality of equidistant tooth flanks, each tooth flank of one of said cams being in registry with a different tooth flank of the other cam, said followers being arranged track one of said cams and said pallet cooperating with the flanks of the other cam.

19. A release mechanism as defined in claim 1, further comprising a housing for said motor, said winding means, said cam means and said regulating members, a current-conducting shaft fixedly mounted in said housing and rotatably supporting said cam means, said shaft having an elongated first terminal extending from said housing, a second terminal spacedly surrounding said first terminal and outwardly adjacent to said housing, insulating means between said terminals, and first and second conductor means respectively connecting said first and second regulating members with said first and second terminals, one of said conductor means including said shaft.

20. A release mechanism as defined in claim 19, wherein said one conductor means further comprises a leaf spring connected with said shaft.

21. A release mechanism as defined in claim 20, wherein one of said regulating members is pivotably mounted on said leaf spring and said leaf spring is rotatable about the axis of said shaft to thereby change the distance between said followers, such distance determining the magnitude of said second angle.

22. A release mechanism as defined in claim 19, wherein the other conductor means comprises a spring which contacts the respective regulating member and said second terminal and is arranged to bias the respective follower against said cam means.

* * * * *